No. 676,668. Patented June 18, 1901.
J. PATTEN.
METHOD OF MANUFACTURING ICE.
(Application filed Feb. 19, 1901.)
(No Model.) 2 Sheets—Sheet 1.
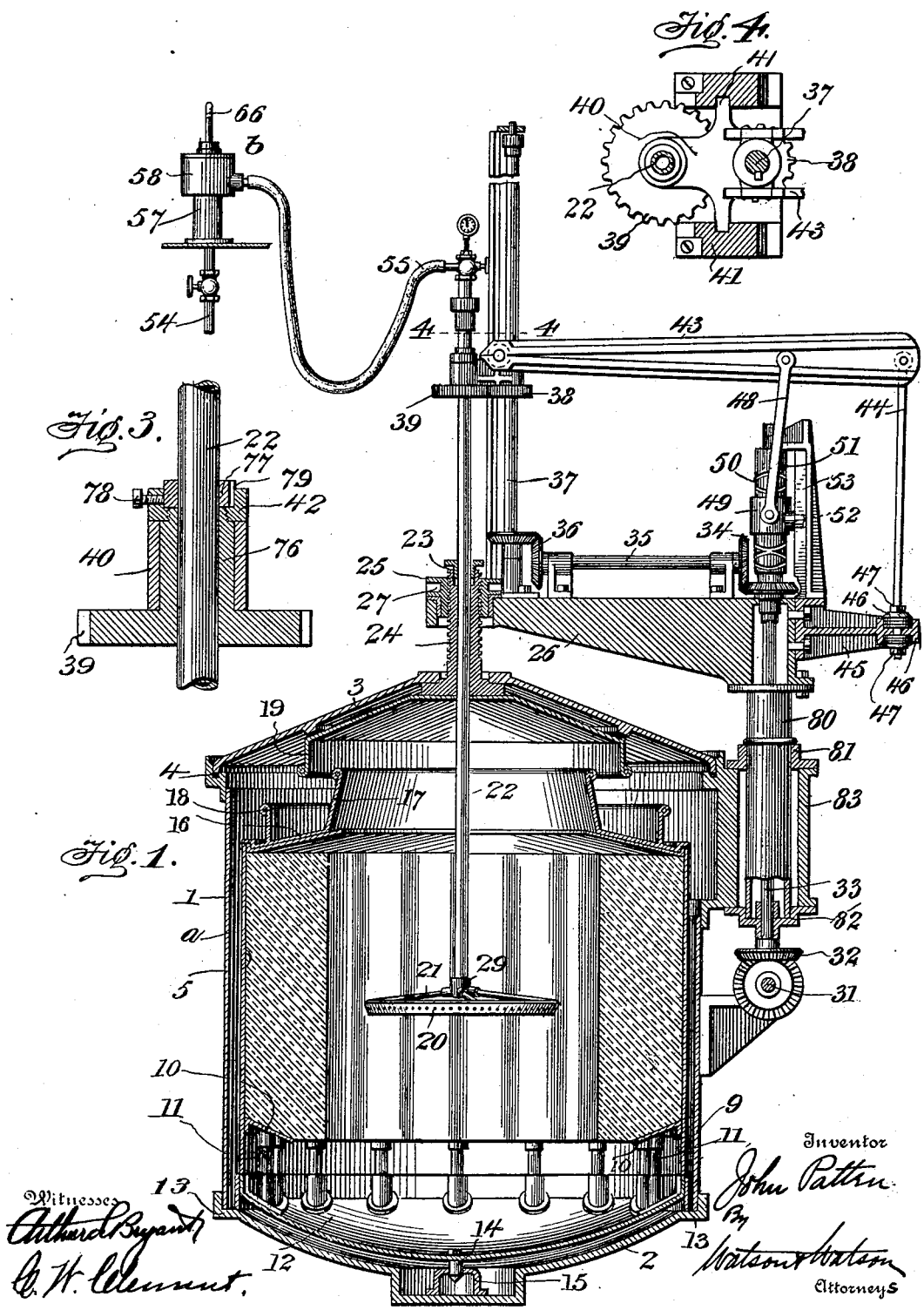

No. 676,668. Patented June 18, 1901.
J. PATTEN.
METHOD OF MANUFACTURING ICE.
(Application filed Feb. 19, 1901.)
(No Model.) 2 Sheets—Sheet 2.
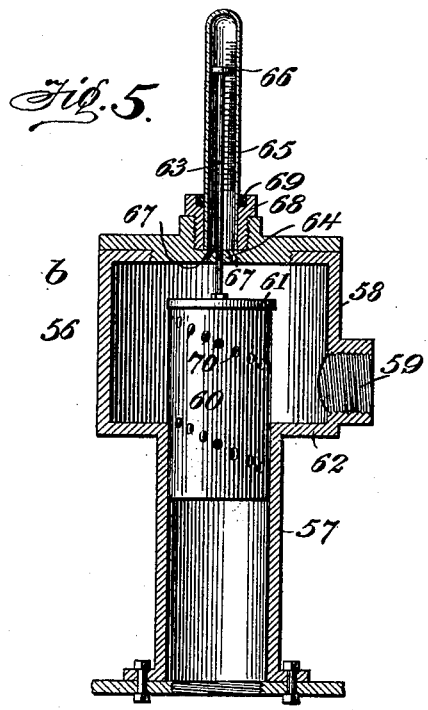
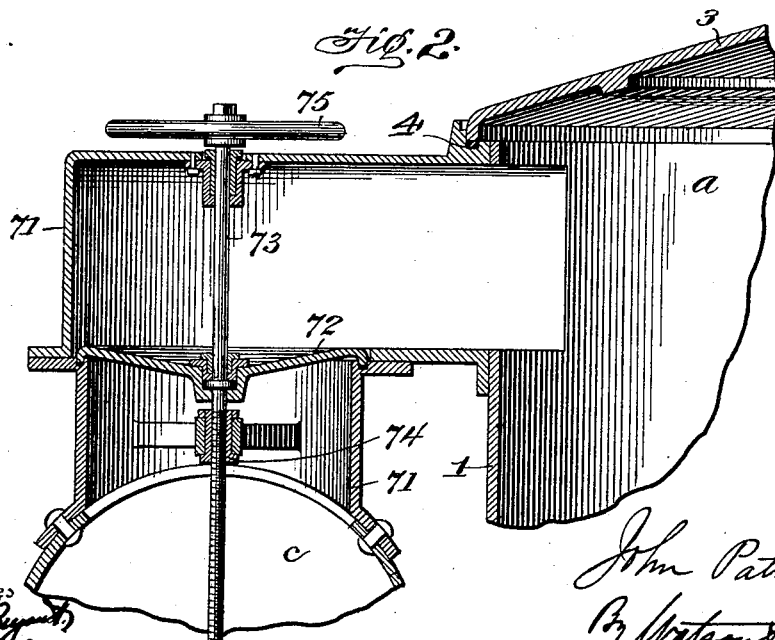

UNITED STATES PATENT OFFICE.

JOHN PATTEN, OF BALTIMORE, MARYLAND, ASSIGNOR TO THE PATTEN VACUUM ICE MACHINE COMPANY, OF SAME PLACE.

METHOD OF MANUFACTURING ICE.

SPECIFICATION forming part of Letters Patent No. 676,668, dated June 18, 1901.

Application filed February 19, 1901. Serial No. 47,902. (No specimens.)

*To all whom it may concern:*

Be it known that I, JOHN PATTEN, a citizen of the United States, residing at the city of Baltimore, in the State of Maryland, have invented certain new and useful Improvements in Methods of Manufacturing Ice, of which the following is a specification.

In carrying out my process I create and continuously maintain a high vacuum in a freezing-chamber and spray the water to be frozen upon a surface in said chamber upon which the ice is to be formed. The ice may be formed by my method upon any surface of the chamber; but I preferably form it upon a wall which is vertical or inclined to the horizontal. Such a wall may be termed "self-draining," for the reason that water cannot accumulate and stand upon it.

In carrying out my process under normal conditions the particles of water freeze substantially at the time when they come in contact with the wall or surface against which they are directed or with the ice previously formed upon said wall. It sometimes happens, however, that the vacuum is impaired temporarily, and if ice were being formed on the bottom of the freezing-chamber a pool of water would collect while the vacuum is below its normal condition, and such water would form very porous and imperfect ice after the vacuum is restored. By forming the ice on a self-draining surface any excess or unfrozen water will immediately run off, and no damage will be done to the ice by temporary stoppage of the mechanism or impairment of the vacuum; but similar good ice may be formed by spraying on any other surface if the vacuum apparatus is kept working in good condition and the supply of water be properly regulated. The spray of water is preferably made to traverse the evacuated space for some distance before striking the freezing-surface. During its period of travel a portion of the water evaporates and extracts heat from the remainder, cooling it to or below the freezing-point. It is a known fact that water out of contact with a solid substance may be cooled below the freezing-point without congealing and that such water will congeal instantly upon contact with a cold solid substance, such as ice.

The present process produces hard and compact ice, and the water freezes at or substantially at the point of its impact on the ice-surface, which fact leads me to believe that in carrying out my process the particles of water are cooled to or below the freezing-point in passing through space, notwithstanding the temperature of the water introduced into the apparatus may be considerably above the freezing-point.

The preferred apparatus for carrying out my process includes a freezing-chamber, means for maintaining a high vacuum therein, means for spraying the water through the evacuated space upon a wall or surface upon which the ice is to be formed, means for regulating the flow of water whereby the amount introduced will not exceed the capacity of the vacuum-producing apparatus, and means for causing the spray of water to travel over the surface upon which the ice is formed and play upon different portions thereof successively.

In the accompanying drawings I have illustrated one form of apparatus with which the present process may be performed.

In said drawings, Figure 1 is a vertical sectional view of apparatus suitable for distributing water over a vertical wall in a closed vessel subjected to a vacuum. Fig. 2 is a partial section illustrating the connection between the freezing-chamber (shown in Fig. 1) and the pipe leading to the vacuum-producing apparatus. Fig. 3 is a detail of part of Fig. 1. Fig. 4 is a section on the line 4 4 of Fig. 1. Fig. 5 is a sectional view of the device for indicating the flow of water.

Referring to the drawings, *a* indicates a freezing-chamber within which the ice is formed.

*b* indicates a device for indicating or measuring the flow of water to the freezing-chamber, and *c* indicates the pipe through which the vapor passes from the freezing-chamber to the vacuum-pump. (Not shown.)

The freezing-chamber comprises an outer cylindrical wall 1, a bottom plate 2, and a cover 3, the latter being removable and normally resting on a packing-ring 4, the entire vessel when closed being air-tight. The ice is formed upon an inner removable wall 5, which rests upon a pan 12 and encircles a series of tables 10, supported by a series of pedestals 11, which in turn rest upon the pan. The pan 12 is supported by a ring 13 and provided with a centering-pin 14, which enters a step 15, centrally located in the bottom of the freezing-chamber. Resting on the upper edge of the wall 5 is an annular cover 16, upon which are supported two baffle-plates 17 18. Depending from the outer cover 3 and intermediate the annular baffle-plates 17 18 is a third baffle-plate 19. These plates prevent particles of water or snow from being drawn out with the vapor and falling between the walls 1 and 5. Should water fall between these walls, the ice-chamber could not be readily removed, as hereinafter described. The water to be frozen is sprayed against the wall 5 by an annular spray-pipe 20, connected by hollow arms 21 to a vertically-arranged supply-pipe 22. Pipe 22 extends upward through a stuffing-box 23, formed in the upper end of a screw 24, which is centrally and rigidly connected to the cover 3. The screw 24 is engaged by a nut 25, which is rotatably supported in the arm 26 of a crane, to be hereinafter described. Nut 25 can be turned by inserting a suitable lever or handle in sockets 27. The spray-pipe is reciprocated vertically to form a sheet or cylinder of ice of the same thickness throughout the depth of the wall 5, and it is rotated at the same time to prevent the ice from being formed in ridges within said wall. Under the high vacuum which is used in producing ice in this apparatus the water freezes at the moment it strikes the wall 5 or the ice formed on said wall, and if the spray-pipe 20 were not kept constantly moving the inner surface of the ice would be very irregular. The spray-pipe is rotated continuously by means of a power-shaft 31, bevel-gears 32, vertical shaft 33, bevel-gears 34, horizontal shaft 35, bevel-gears 36, vertical shaft 37, gear 38, splined on said shaft and adapted to slide upon and rotate with it, and an intermeshing gear 39, carried by the supply-pipe 22. The gear 38 rotates in a sliding head 40, which slides vertically upon guides 41. Gear 39 is also carried by said head 40, and a collar 42 sustains the pipe 22 upon the head 40.

The spray-pipe 20 and supply-pipe 22 are reciprocated vertically by means of a lever 43, one end of which is pivotally connected to the head 40, while the other end is connected by a link 44 to a bracket 45, forming a rearward extension of the crane-arm 26. The link 44 is connected to the bracket 45 with a limited degree of flexibility by means of a pair of flexible washers 46, which engage opposite sides of the bracket and are held in place by nuts 47. The lever 43 is rocked by means of a link 48, which connects an intermediate part of the lever pivotally with a ring 49. On the inner surface of this ring is a guide-piece which engages a continuous spiral guide-groove 50 in a drum or enlargement 51 on the upper end of shaft 33. The ring 49 has also a rearward projection 52, which engages a fixed vertical guide 53 to prevent the ring from turning. It will be seen that the means described are adapted to continuously rotate the spray-pipe 20 and at the same time to reciprocate it vertically between the upper and the lower extremes of the wall 5.

In Fig. 3 is illustrated in detail, on an enlarged scale, the connection between the supply-pipe 22 and gear 39. A collar 77 is brazed or otherwise suitably secured to said supply-pipe and is provided with a key or spline 79, that enters a corresponding groove or seat in the collar 42, which collar is engaged by threads with the upwardly-extending hub of gear 39. A set-screw 78 normally holds the collars 42 and 77 together, so that the pipe 22 is rotated by the gear 39. When, however, the tank is opened and ice is to be removed, the set-screw is loosened, and the supply-pipe and spray devices connected therewith can then be lifted vertically by hand above the upper end of the tank and freezing-chamber, so as to offer no obstruction to the lateral swinging of arm 26.

It is desirable to be able to tell at any moment the amount of water per minute which is running into each freezing-chamber. For this purpose the gage $b$ is provided on the pipe 54, leading from the water-supply tank to the freezing-chamber. Pipe 54 is connected with the reciprocating pipe 22 by a flexible section 55. The preferred form of indicator $b$ is shown in Fig. 5, in which 56 indicates a casing comprising a lower vertical cylindrical portion 57 and a chamber 58 of larger diameter above said cylinder. The lower end of the cylindrical portion is open and adapted to be connected to the pipe system from whence the fluid to be measured flows, and its upper end opens into the bottom of the chamber 58, as shown. Said chamber is provided with a suitable outlet or pipe connection 59, and the casing thus forms a part of the pipe system. Within the casing is arranged a hollow piston 60, said piston being closed at its upper end by a laterally-projecting cap 61 and being left open at its lower end. This piston fits closely within the cylinder 57 and is movable into and out of the chamber 58. The walls of the cylinder are formed with a series of spirally-arranged openings 70, extending downwardly from its closed end, said openings being of equal size and spaced at equal distances apart. The laterally-projecting cap 61 forms a stop which abuts against the bottom wall 62 of the chamber and limits the downward movement of the piston. An indicating-rod 63 is attached to the cylinder-head and projects upwardly therefrom through a small opening 64 in the casing into a vertically-graduated glass tube 65, arranged upon the top of the casing, said tube being sealed at its outer end. A disk or index 66 is arranged upon the top of the rod 63 to indicate the elevation of the latter upon the graduation-marks of the tube, and suitable vent-holes 67 extend from the interior of the tube through the top of the casing into the chamber, so that the movement of the piston will not be retarded by liquid entering and remaining within the tube. The tube, as shown, is secured in place in a liquid-tight manner by a nut 68, having a recess in its upper end within which is placed sealing-wax or cement 69.

When no fluid is passing through the device, the piston remains in its lowermost position, with its projecting shoulder resting upon the bottom wall 62 of the chamber. When the fluid is turned on, it enters the lower end of the cylinder 57 and thence passes into the interior of the piston, raising the latter until a sufficient number of the openings 70 rise above the bottom of the upper chamber to permit the water to flow outward freely into said chamber and thence through the outlet 59. It will be apparent that as the volume of fluid passing into the cylinder is increased the upward pressure on the piston will be temporarily increased and the latter will rise to a point where a sufficient number of openings are uncovered to permit the fluid to pass freely through into the chamber and that as the volume decreases the piston will fall a distance proportionate to the decrease in volume, leaving only a sufficient number of openings above the base to permit the fluid to pass freely through. As the indicating-rod is connected to the piston, it will rise and fall with the latter, and the volume of fluid passing at any given time may be ascertained by observing the position of the index upon the scale. As the openings 70, &c., are arranged spirally of the piston and at such distances apart longitudinally thereof that before one opening is raised entirely above the base 62 the succeeding opening will rise partly above the base, the movement of the piston will correspond very closely to the increase or decrease in the flow of fluid. The spiral arrangement of the openings also permits the fluid to escape on all sides of the piston in small streams which do not interfere with one another.

As shown in Fig. 2, there is a valve 72 in the connecting-pipe 71 between the freezing-chamber $a$ and the vapor pipe or trunk $c$, to which the exhaust or vacuum mechanism is connected, by means of which valve the freezing-chamber may be shut off from the vapor-pipe when it is desired to open the former for the purpose of removing the ice. As shown, this valve is operated by a valve-stem 73, which is threaded into the central hub 74 of a spider supported by a vertical portion of the connecting-pipe 71. The valve 72 is operated by a handle 75 on the shaft or stem 73.

The operation of the freezing-chamber is as follows: Assuming that the chamber is closed air-tight and exhausted to a sufficient degree, the machinery is started and the valve in water-pipe 54 opened until the gage $b$ indicates that a proper supply is flowing to the spray-pipe. The spray-pipe is reciprocated vertically and simultaneously rotated, in consequence of which the water is sprayed evenly over the wall 5. The length of its vertical reciprocation is practically equal to the depth of said wall, and as the ice-cylinder is formed its lower end rests upon the tables 10. Should any of the water drop it will be caught in the pan 12. It is found, however, that when the apparatus is in proper working condition practically all of the water will freeze immediately as it strikes the surface of the ice, and very little of it will fall below the point of its first contact, so that the ice-cylinder may be built out, as illustrated in Fig. 1 of the drawings. After the ice has been formed to the desired thickness, which can be readily determined by passing the water through a meter or inspecting the water-level in the tank from which it is drawn, the water is shut off and the valve 72 is closed tightly. The mechanism for rotating and reciprocating the spray-pipe is then stopped with the spray-pipe in its highest position. The nut 25 is then turned, which raises the screw 24 and the cover 3, after which set-screw 78 is loosened and spray-pipe raised and the crane 26 is swung to one side, carrying the cover and spray-pipe with it. The crane is mounted upon a hollow spindle 80, which has a seat 81 and a bearing 82 on a fixed bracket 83, Fig. 1. It will be seen that the vertical shaft 33 passes through the axis of the crane-spindle 80 and that the crane can be rotated without disarranging the mechanism which it carries. The pan 12 and the parts supported by it, together with the cylinder of ice, are then lifted out of the freezing-chamber and transported to any convenient place for cutting the ice into blocks.

By leaving a space between the outer surface of baffle-plate 19 and the inner surface of the cover to the freezing-chamber the surface of said baffle-plate is prevented from becoming heated enough to loosen the ice which forms on the under surface. If such ice should become loosened and fall, damage would probably result to the sprinkler.

The apparatus illustrated and described is one of many forms which may be used to carry out the present invention, and it is to be understood that the claims are in no sense limited to any particular apparatus.

The essential features of my process are the division of the fluid to be frozen into small particles by spraying it and the freezing of the particles of fluid substantially as and where they strike the surface upon which the fluid is to be frozen.

My method of forming ice is applicable to freezing other substances than water, notably for freezing milk for the purpose of preserving and storing it. While, therefore, I have described my process as applied to water, I desire it to be understood that the process includes freezing other liquids which congeal when subjected to the conditions under which water freezes.

Having described my invention, what I claim, and desire to secure by Letters Patent, is—

1. The method of manufacturing ice which consists in maintaining a high vacuum within a freezing-chamber and simultaneously spraying water upon a surface in said chamber in such regulated quantities that the particles of water will congeal substantially as and where they strike said surface or the ice previously formed thereon.

2. The method of manufacturing ice which consists in maintaining a high vacuum within a freezing-chamber and simultaneously spraying water upon a vertical or self-draining surface in said chamber in such regulated quantities that the particles of water will congeal substantially as and where they strike said surface or the ice previously formed thereon.

3. The method of manufacturing ice which consists in maintaining a high vacuum within a freezing-chamber and causing a spray of water to play upon and travel over a surface in said chamber upon which ice is to be formed, the water being supplied in such regulated quantities that the particles thereof will congeal substantially as and where they strike said surface or the ice previously formed thereon.

4. The method of manufacturing ice which consists in maintaining a high vacuum within a freezing-chamber and causing a spray of water to traverse the evacuated space a sufficient distance to reduce the water to the freezing-point, or below, said water being directed upon a surface upon which the ice is to be formed, whereby the water freezes substantially as and where it strikes said surface or the ice previously formed thereon.

5. The method of manufacturing ice which consists in maintaining a high vacuum within a freezing-chamber and projecting a spray of water through the evacuated space and upon a surface upon which ice is to be formed, said spray being made to travel over said surface and play upon different portions thereof successively.

In testimony whereof I affix my signature in presence of two witnesses.

JOHN PATTEN.

Witnesses:
W. T. HOOFNAGLE,
H. WILLARD GRIFFITHS.